United States Patent
Park et al.

(10) Patent No.: US 7,850,750 B2
(45) Date of Patent: Dec. 14, 2010

(54) MODULARIZED HYBRID DUST COLLECTOR

(75) Inventors: Hyun Seol Park, Daejeon (KR); Kyoung Soo Lim, Gyeonggi-do (KR); Sang Do Kim, Daejeon (KR); Ho-Kyung Choi, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 12/226,234

(22) PCT Filed: Apr. 25, 2007

(86) PCT No.: PCT/KR2007/002027
§ 371 (c)(1),
(2), (4) Date: Sep. 28, 2009

(87) PCT Pub. No.: WO2007/142406
PCT Pub. Date: Dec. 13, 2007

(65) Prior Publication Data
US 2010/0018173 A1    Jan. 28, 2010

(30) Foreign Application Priority Data
Apr. 26, 2006    (KR) ..................... 10-2006-0037575

(51) Int. Cl.
*B01D 41/00*    (2006.01)
(52) U.S. Cl. .............. 55/304; 55/301; 55/302; 55/303; 55/337; 55/345; 55/346; 55/428; 55/459.1; 55/482; 55/455
(58) Field of Classification Search ........... 55/301–304, 55/337, 345, 346, 428, 459.1, 482, 455
See application file for complete search history.

(56) References Cited

U.S. PATENT DOCUMENTS

| | | | | |
|---|---|---|---|---|
| 3,430,419 A | * | 3/1969 | Reinecke et al. | ....... 55/302 |
| 4,639,260 A | * | 1/1987 | Borow | ....... 55/302 |
| 4,865,627 A | * | 9/1989 | Dewitz et al. | ....... 95/12 |
| 5,961,675 A | | 10/1999 | Son et al. | |
| 2002/0020154 A1 | | 2/2002 | Yang | |
| 2003/0000384 A1 | | 1/2003 | Tomimatsu et al. | |
| 2005/0000055 A1 | | 1/2005 | Cheng | |
| 2009/0106931 A1 | | 4/2009 | Lin | |

FOREIGN PATENT DOCUMENTS

| | | |
|---|---|---|
| KR | 10-2004-0090182 | 10/2004 |
| KR | 20-0372893 | 1/2005 |

\* cited by examiner

*Primary Examiner*—Jason M Greene
*Assistant Examiner*—Dung Bui
(74) *Attorney, Agent, or Firm*—Jenkins, Wilson, Taylor & Hunt, P.A.

(57) ABSTRACT

There is provided a modularized hybrid dust collector for treating dust generated in various industrial processes. The box-shaped hybrid dust collector includes a first box-shaped dust collecting unit or a first cylindrical dust collecting unit, to which the inertial impaction and the principle of collecting dust using the centrifugal force are applied, and a second box-shaped dust collecting unit implemented by a dust collecting filter such that a problem of employing a cleaner and a limit of capacity, of a conventional cylindrical dust collector, can be overcome, and a high capacity modularized hybrid dust collector in which the box-shaped hybrid dust collector as a basic module and a plurality of dust collector modules are combined.

9 Claims, 7 Drawing Sheets

[Fig. 1]
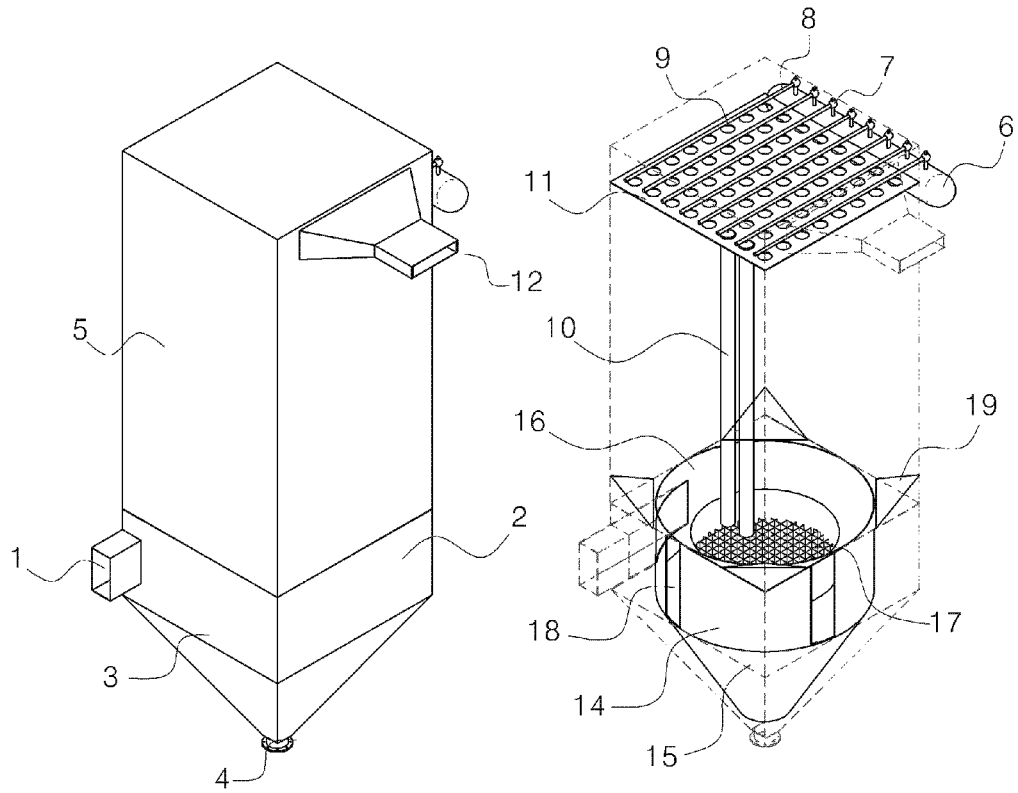
[Fig. 2]
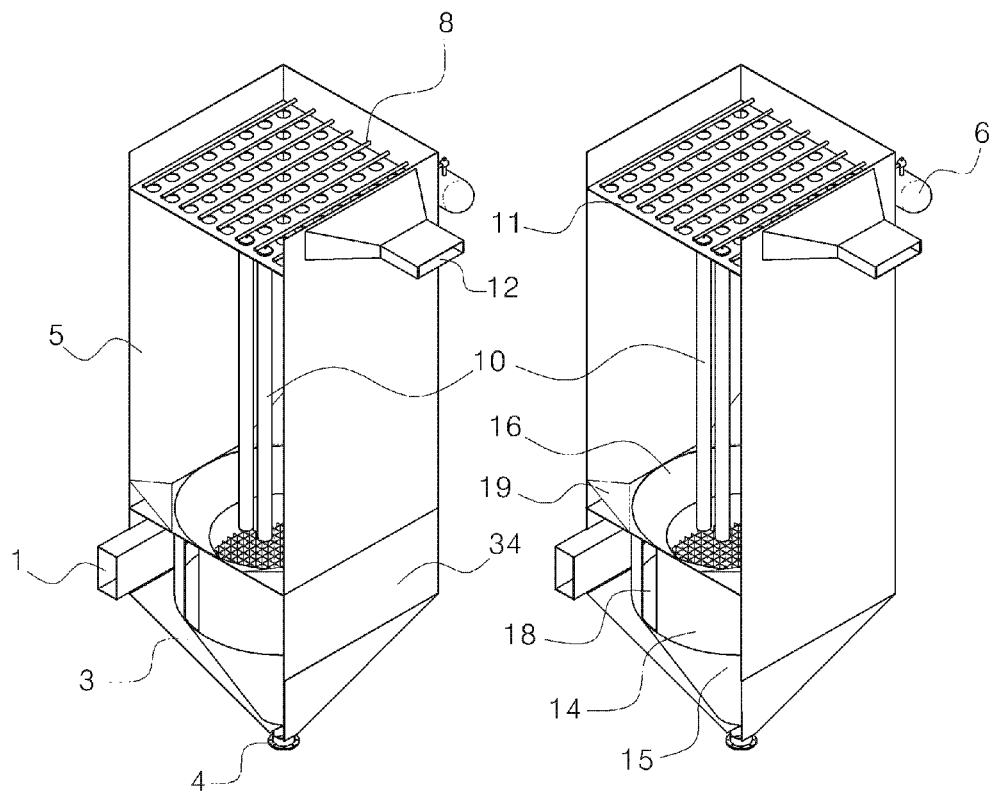

[Fig. 3]
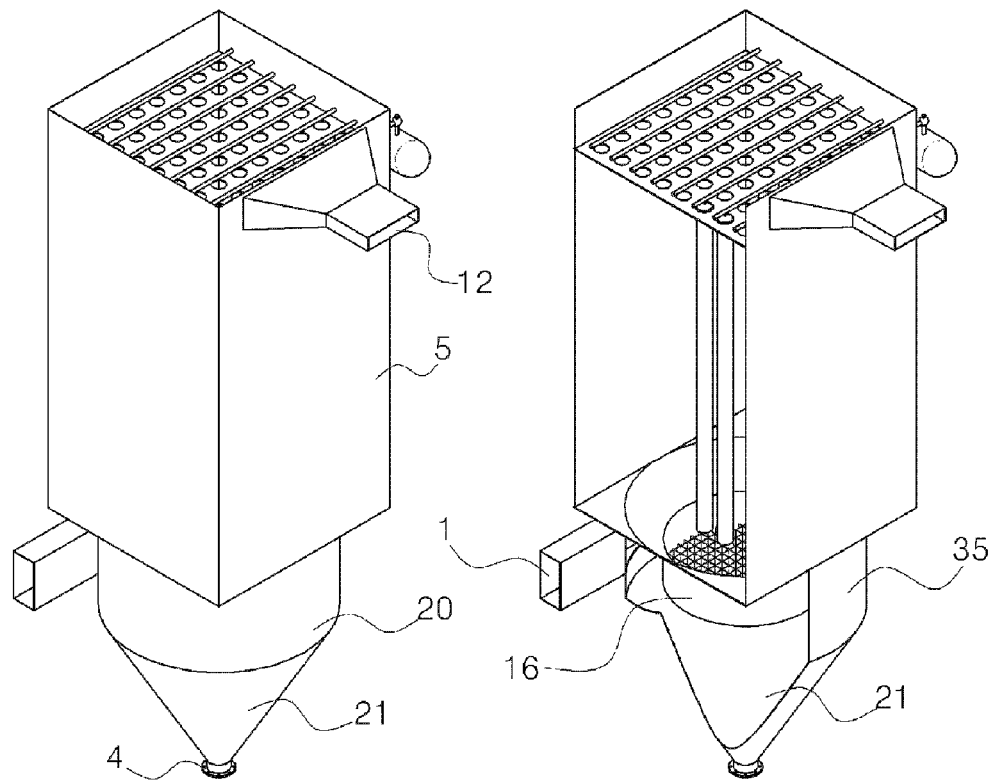
[Fig. 4]
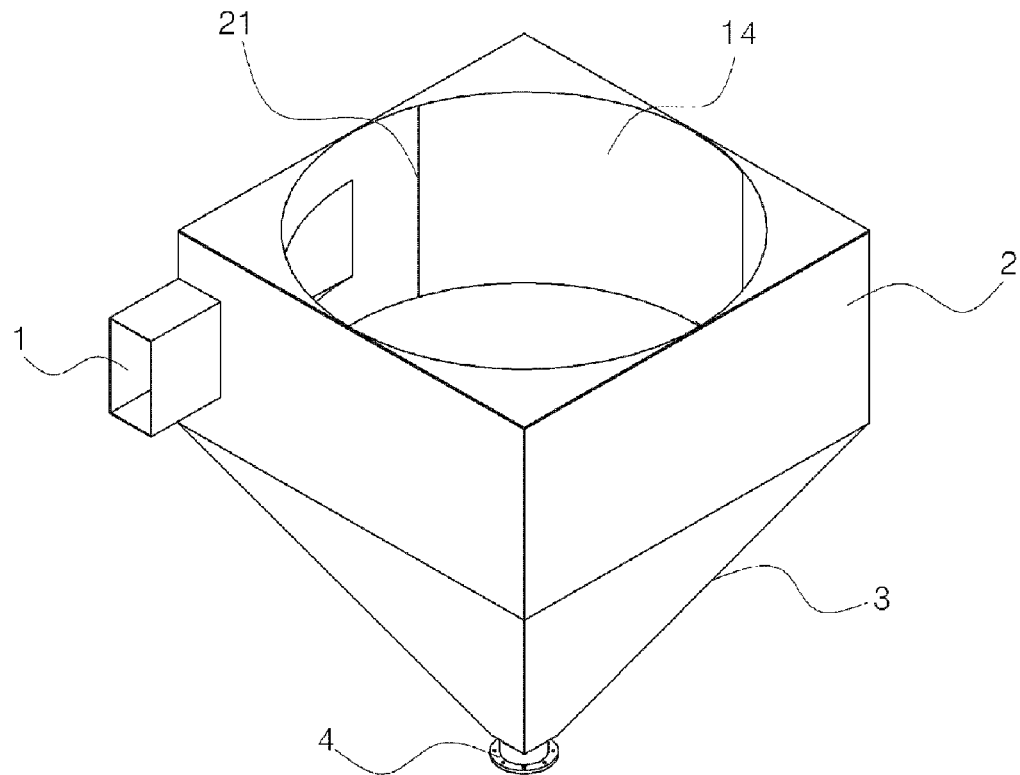

[Fig. 5]
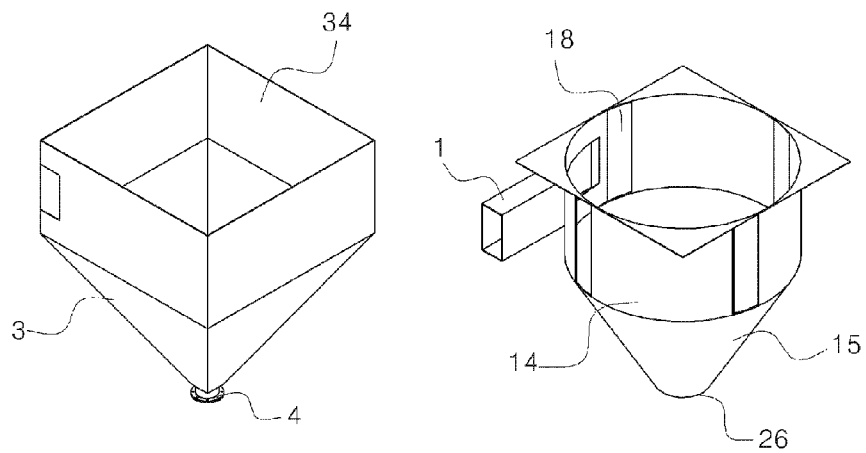
[Fig. 6]
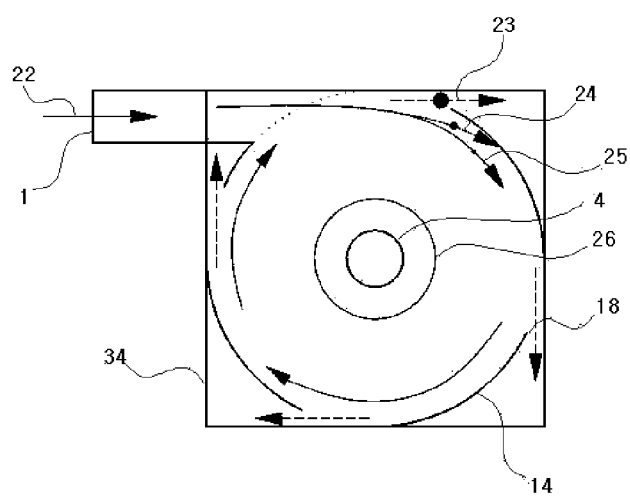
[Fig. 7]
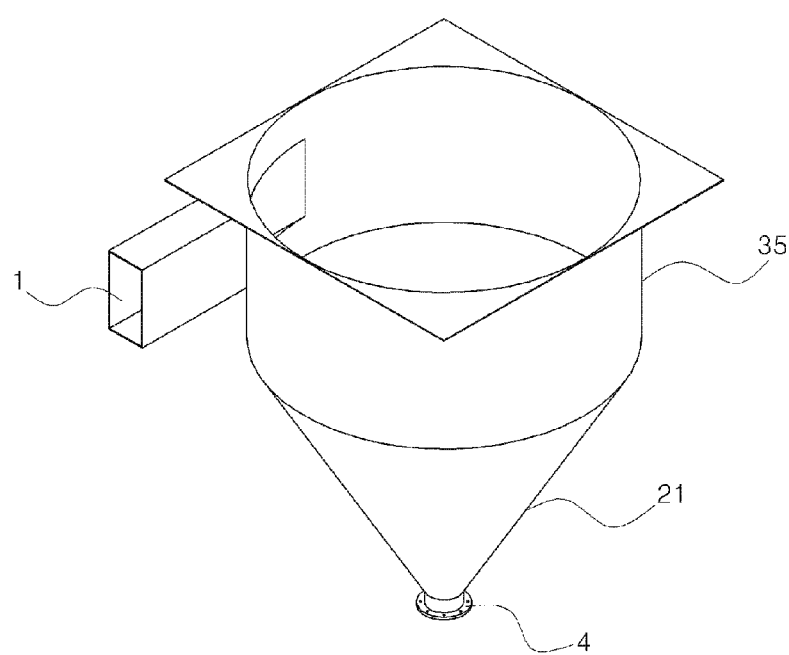

[Fig. 8]
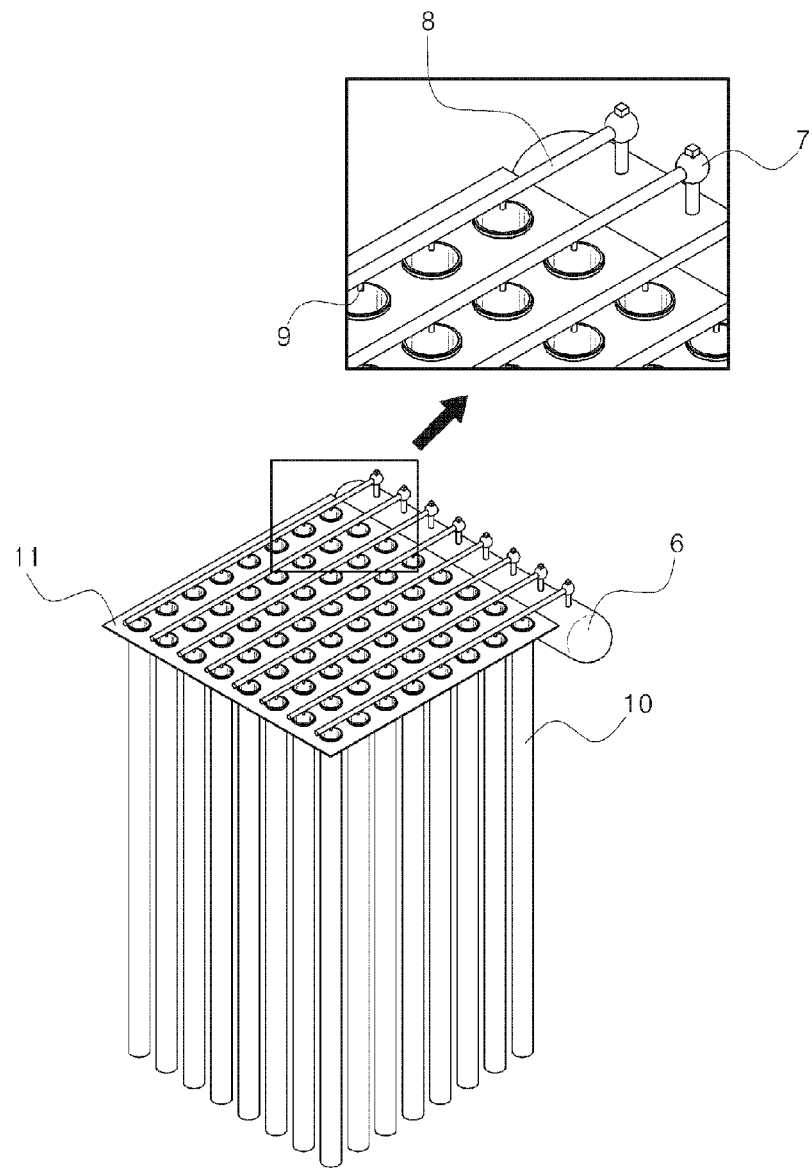
[Fig. 9]
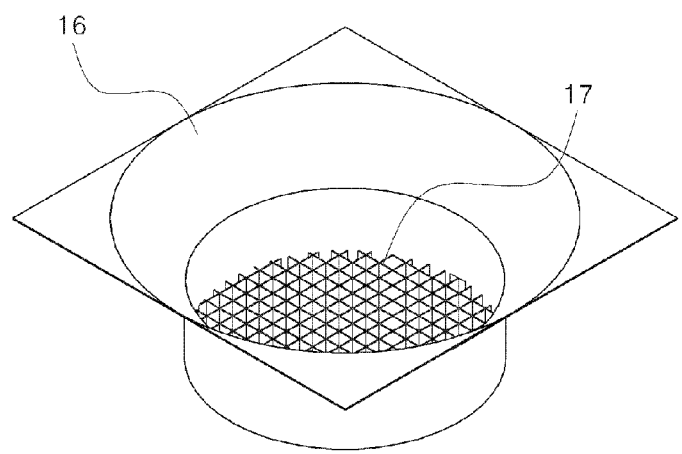

[Fig. 10]
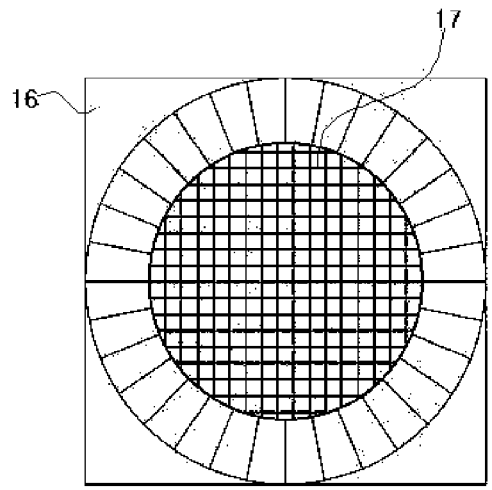
[Fig. 11]
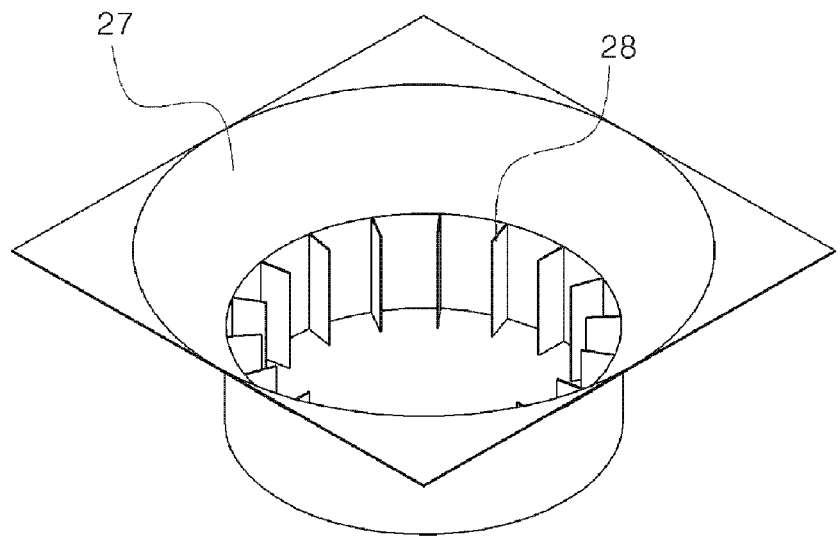
[Fig. 12]
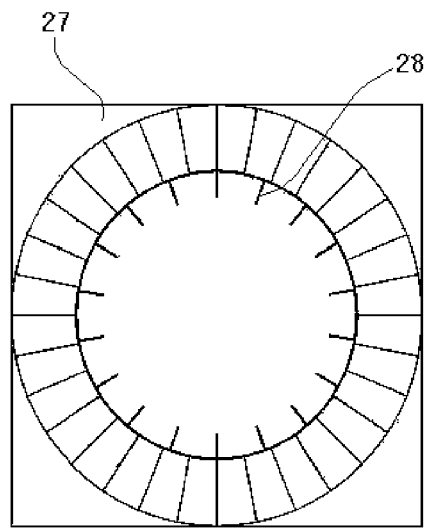

[Fig. 13]
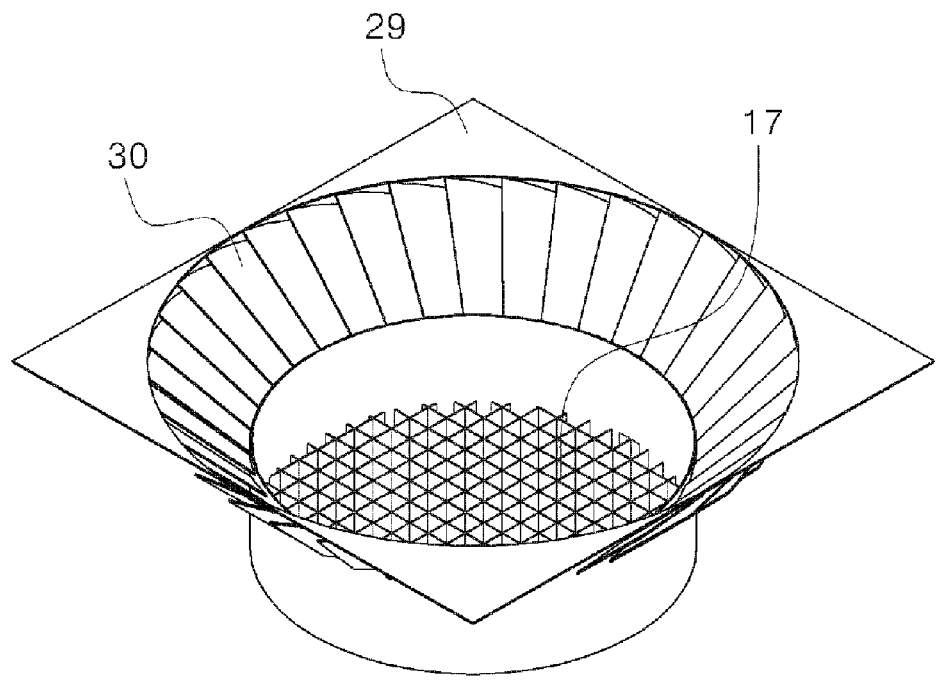
[Fig. 14]
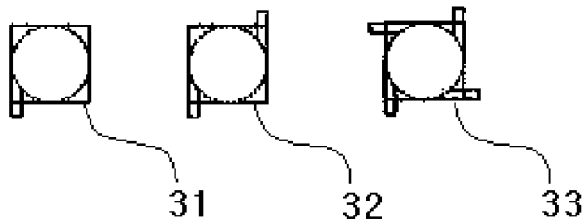
[Fig. 15]
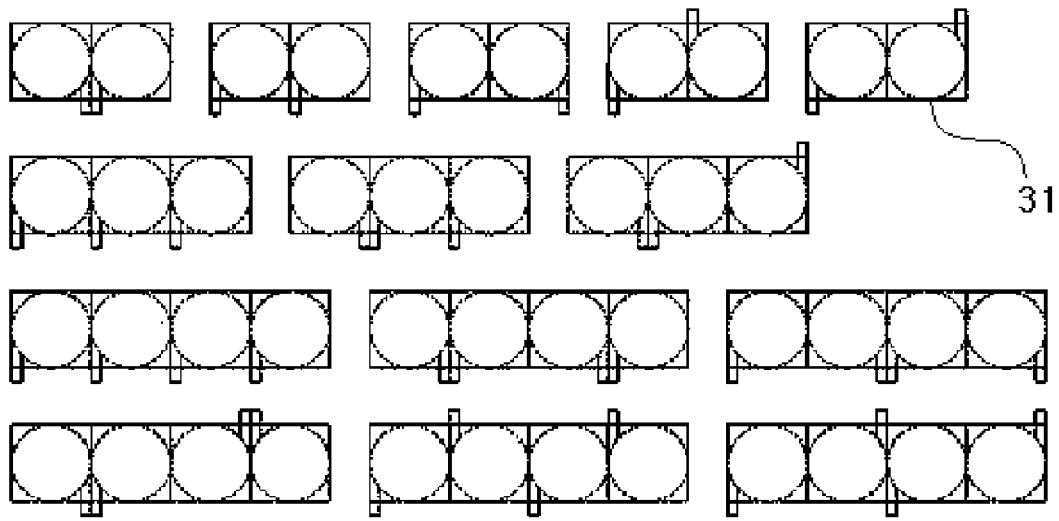

[Fig. 16]
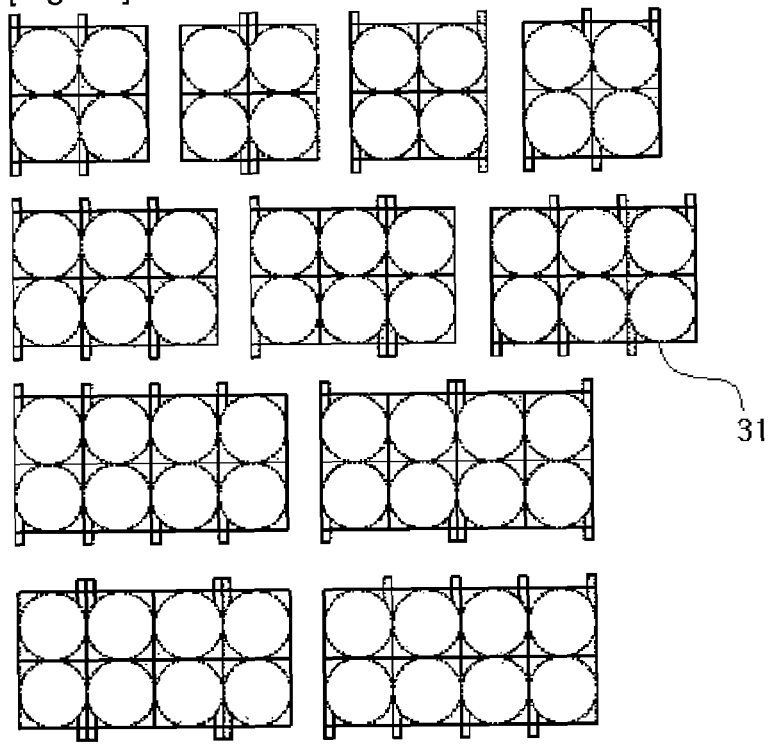
[Fig. 17]
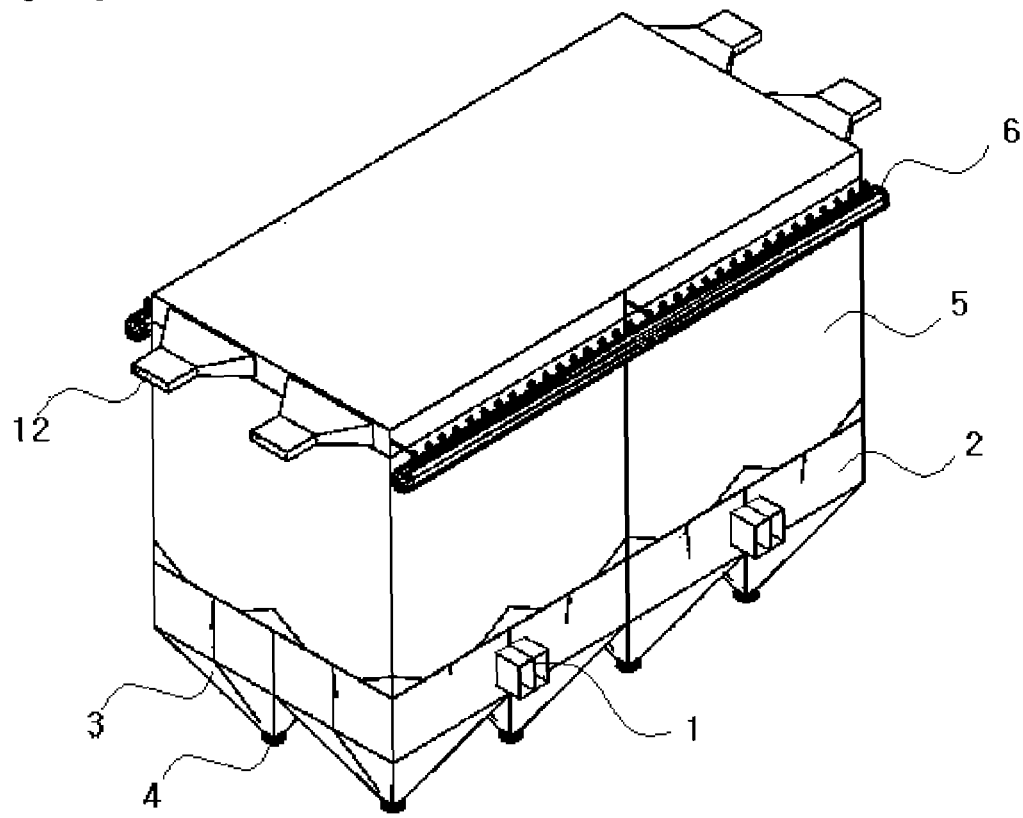

MODULARIZED HYBRID DUST COLLECTOR

TECHNICAL FIELD

The present invention relates to a modularized hybrid dust collector for treating dust generated in various industrial processes, and more particularly, to a box-shaped hybrid dust collector including a first box-shaped dust collecting unit or a first cylindrical dust collecting unit, to which the inertial impaction and the principle of collecting dust using the centrifugal force are applied, and a second box-shaped dust collecting unit implemented by a dust collecting filter such that a problem of employing a cleaner and a limit of capacity, of a conventional cylindrical dust collector, can be overcome, and a high capacity modularized hybrid dust collector in which the box-shaped hybrid dust collector as a basic module and a plurality of other dust collector modules are combined.

BACKGROUND ART

There are common dust collecting techniques such as an inertial impaction, a gravitational setting, a wet cleaning, a centrifugal dust collecting, an electric dust collecting, and fabric filtration. The present invention employs a hybrid dust collecting technique in which the inertial impaction, the centrifugal dust collecting, and the fabric filtration are combined with each other.

There are several related arts relating to the above-described techniques such as Korean Patent No. 10-0096843-0000, registered on Mar. 12, 1996, entitled "The Collecting Apparatus for Turbulent Flow Gas", Korean Patent No. 10-0034978-0000, registered on Aug. 9, 1990, entitled "Dust Collector", and Korean Patent No. 10-0242228-0000, registered on Nov. 9, 1999, entitled "Apparatus for The High Efficiency Compact Cybagfilter". All the patents have a restricted capacity of treating gas because a basic body has a cylindrical cross-section, and drawbacks of arranging dust filters and of constituting cleaners. Moreover, commonly in the above patents, dust collecting technique of using the centrifugal force of introducing gas and the fabric filtration using a dust collecting filter are combined. However, since the flow of the treating gas introduced into a fabric filter is not distributed uniformly, the performance of the fabric filtration is deteriorated.

DISCLOSURE OF INVENTION

Technical Problem

Therefore, the present invention has been made in view of the above problems, and it is an aspect of the present invention to provide a modularized hybrid dust collector in which a first dust collecting unit is configured by which a virtual impaction is further combined with the centrifugal dust collecting applied to a conventional cylindrical hybrid dust collector, and more particularly, a slit is formed in an outer wall of a modified cyclone such that dust particles with a great inertia contained in the introduced treating gas swirl along the outer wall of a cyclone, pass through the slit, and then are removed from the treating gas when the dust particles collide against a wall of an outer box, and dust particles with a low inertia are removed by the modified cyclone.

It is another aspect of the present invention to provide a modularized hybrid dust collector in which the hybrid dust collector is employed as a basic module and a plurality of the modules are combined with each other to overcome the capacity limit.

Technical Solution

In accordance with an aspect of the present invention, a modularized hybrid dust collector for removing dust contained in a treating gas by employing a plurality of dust collecting principles in a combination manner comprises a first box-shaped dust collecting unit to remove dust contained in the treating gas that is introduced through a gas inlet using an inertial impaction and a centrifugal dust collecting; a second box-shaped dust collecting unit with a right rectangular cross-section in which a dust filter is installed such that a gas in which dust contained in the treating gas, which is introduced in the direction contacting a side of the first box-shaped dust collecting unit and a majority of dust contained in the treating gas is removed, is completely removed is discharged through an outlet; a reversed pyramid-shaped dust hopper to accommodate dust removed by the first box-shaped dust collecting unit and dust removed by the dust filter and detached from the surface of the dust filter by a periodic cleaning; and a dust discharging tube to discharge the dust accommodated in the dust hopper.

Advantageous Effects

As described above, according to the present invention, the majority of dust is removed by the first dust collecting unit installed in the front end of the dust filter by which the first dust collecting unit is combined with a second dust collector installed with a dust filter into an integrated body, so that the dust load of the dust filter as the second dust collecting unit is remarkably reduced to significantly increase a lifespan of the dust filter and three kinds of dust collecting are applied to a single apparatus to minimize an installation space required for the installation of the dust collector.

Moreover, according to the present invention, since the plurality of dust collectors as a basic module are combined with each other to increase the volume of the dust collector regardless of the treating capacity thereof, a big-sized high performance hybrid dust collector can be achieved. Thus, the dust collector of the present invention can be applied to dust collecting apparatuses of a power plant, a cement plant, a huge incinerating facility, and a boiler in which a great deal of gas is treated.

BRIEF DESCRIPTION OF THE DRAWINGS

These and/or other aspects and advantages of the present invention will become apparent and more readily appreciated from the following description of the embodiments, taken in conjunction with the accompanying drawings, in which:

FIG. 1 is a view and a perspective view illustrating an outer appearance and a structure of a basic hybrid dust collector;

FIG. 2 is a view illustrating an inner structure of the basic hybrid dust collector;

FIG. 3 is a view illustrating an outer appearance and an inner structure of a first cylindrical dust collecting unit of the basic hybrid dust collector;

FIG. 4 is a view illustrating an outer appearance of a first box-shaped dust collecting unit of the basic hybrid dust collector;

FIG. 5 is a view illustrating outer appearances of an outer box and an outer cylindrical structure to constitute the first box-shaped dust collecting unit;

FIG. 6 is a view illustrating the dust collecting principle applied to the first box-shaped dust collecting unit;

FIG. 7 is a view illustrating an outer appearance of the first cylindrical dust collecting unit;

FIG. 8 is a view illustrating the arrangement of a dust filter and an impaction flow type cleaner;

FIG. 9 is a view illustrating an outer appearance of an inner cylinder of the first dust collecting unit in which lattices are installed;

FIG. 10 is a plan view illustrating an inner cylinder of the first dust collecting unit in which the lattices are installed;

FIG. 11 is a view illustrating an outer appearance of an inner cylinder of the first dust collecting unit in which gas flow disturbing plates are installed;

FIG. 12 is a plan view illustrating the inner cylinder of the first dust collecting unit in which the gas flow disturbing plates are installed;

FIG. 13 is a view illustrating an outer appearance of an inner cylinder of the first dust collecting unit having a plurality of blades;

FIG. 14 is a plan view illustrating a hybrid dust collector module having various arrangements of dirty gas inlets;

FIG. 15 is a plan view illustrating a huge dust collector having various arrangements and sizes by combining the basic hybrid dust collector modules with each other in a single row;

FIG. 16 is a plan view illustrating a huge dust collector having various arrangements and sizes by combining the basic hybrid dust collector modules with each other in two rows; and FIG. 17 is an exemplary view illustrating a huge dust collector having eight basic hybrid dust collector modules with each other in two rows.

EXPLANATION ON ESSENTIAL ELEMENTS OF DRAWINGS

1: inlet
2: first box-shaped dust collecting unit
3: dust hopper
4: dust discharging tube
5: second box-shaped dust collecting unit
6: compressed air container
7: diaphragm solenoid valves
8: compressed air spraying tubes
9: compressed air spraying nozzles
10: dust filter
11: dust filter fixing plate
12: outlet
17: lattice structure
18: slit
19: Dust sliding plates
20: first cylindrical dust collecting unit
21: dust hopper
28: as flow disturbing plates
30: blades
31: hybrid dust collector module

BEST MODE FOR CARRYING OUT THE INVENTION

Hereinafter, embodiments of the present invention will be described in detail with reference to the accompanying drawings.

A modularized hybrid dust collector according to an embodiment of the present invention includes a cleaner installed in the uppermost story, a second box-shaped dust collecting unit 5 having a dust filter and installed in a middle story, a first box-shaped or cylindrical dust collecting unit 2 installed in the lower story and to which the virtual impaction and the centrifugal dust collecting are applied, and a dust hopper 3 and a dust discharging tube 4 which are installed in the lowermost story.

The first box-shaped dust collecting unit in the lower story employs a virtual impactor combined with a modified cyclone such that dust is treated by the inertial impaction and the centrifugal dust collecting. In order for dust to be removed by the virtual impaction, a slit 18 serving as a virtual impactor is formed in the outer wall of the modified cyclone so that dust particles with a large inertia, contained in treating gas that is introduced in the tangential direction, pass through the slit 18 while swirling along the outer wall of the cyclone and collide against a wall of an outer box to be removed. Moreover, an inner cylinder 16 of the modified cyclone of the first box-shaped dust collecting unit 2 is configured to rectify the swirling flow of the treating gas.

The second dust collecting unit 5 in the middle story removes completely the dust by a dust filter 10 and has a right rectangular box-shaped cross-section. In the uppermost story, an impaction flow cleaner, a vibrating cleaner, a backflow cleaner is installed and communicates with an outlet 12.

A huge capacity hybrid dust collector according to the embodiment of the present invention makes the hybrid dust collector as a basic dust collector module and the treating capacity thereof can be increased infinitely by combining a plurality of the dust collector modules with each other. To this end, an outer appearance of the basic dust collector module must have a box shaped with a right rectangular cross-section.

Hereinafter, the structure and operation of the hybrid dust collector according to the embodiment of the present invention will be described in detail with reference to the accompanying drawings.

FIG. 1 shows the basic hybrid dust collector according to the embodiment of the present invention.

As illustrated in FIG. 1, when the dirty gas is introduced into the basic hybrid dust collector through a gas inlet 1, the majority of dust is removed by the first box-shaped dust collecting unit 2 to remove the dust by the inertial impaction and the centrifugal dust collecting, the rest of the dust is completely removed by the dust filter 10 as the second box-shaped dust collecting unit 5, and clean gas is discharged to atmosphere through the outlet 12.

The first box-shaped dust collecting unit 2 includes an outer cylinder 14 with the slit 18 provided in an outer box 34, an inner cylinder 16 with a lattice structure 17, and a cone-shaped outer cylinder 15. The dust removed by the first box-shaped dust collecting unit 2 and the dust filter 10 is collected by the dust hopper 3 and the dust discharging tube 4.

The dust filter 10 is installed to a dust filter fixing plate 11 and dust attached to the dust filter 10 is transmitted to the dust hopper 3 by periodically cleaning. The dust filter 10 may be cleaned in various manners, and FIG. 1 shows the impaction flow type cleaner using a compressed air and a diaphragm solenoid valves 7. The impaction flow type cleaner includes a compressed air container 6 used to clean the dust filter, diaphragm solenoid valves 7, compressed air spraying tubes 8, and compressed air spraying nozzles 9.

The dust detached from the surface of the dust filter 10 by the cleaning is discharged through and collected by the dust discharging tube 4 and the dust hopper 3. Dust sliding plates 19 are installed in the upper corners of the first box-shaped dust collecting unit 2 such that the dust is not accumulated on the corners but slides into the inner cylinder 16.

FIG. 2 shows the inner structure of the basic hybrid dust collector employing the first box-shaped dust collecting unit 2 in detail. The first box-shaped dust collecting unit 2 is configured by combining the virtual impactor with the modified cyclone. The modified cyclone is configured by combining the outer cylinder 14 with the inner cylinder 16. The slit 18 of the outer cylinder 14 serves as the virtual impactor and the outer box 34 of the first box-shaped dust collecting unit removes and collects the dust passing through the slit 18.

The outer cylinder 14 has four slits 18 penetrating positions where the outer cylinder 14 contacts the box of the first box-shaped dust collecting unit 2. A lower end 26 of the cone-shaped outer cylinder 15 is spaced apart from the dust discharging tube 4 in the vertical direction so that the dust naturally drops down along the inner wall of the dust hopper 3 and is collected by the dust discharging tube 4.

The first box-shaped dust collecting unit 2 is configured such that the gas is introduced into the second dust collecting unit 5 through only the inner cylinder 16. The lattice structure 17 of the inner cylinder 16 of the first box-shaped dust collecting unit 2 scatters the swirling flow passing through the inner cylinder 16 uniformly to be introduced into the second dust collecting unit 5.

FIG. 3 shows the outer appearance and the inner structure of a hybrid dust collector having a first cylindrical dust collecting unit 20. In the hybrid dust collector, instead of the first box-shaped dust collecting unit 2 and the dust hopper 3, the first cylindrical dust collecting unit 20 and a cone-shaped outer cylindrical dust hopper 21 are installed. The inner cylinder 16 installed in the first cylindrical dust collecting unit 20 is identical to the inner cylinder 16 in the first box-shaped dust collecting unit 2.

FIG. 4 shows the first box-shaped dust collecting unit 2 and the dust hopper 3 except for the inner cylinder 16. The slits 18 of the outer cylinder 14 have the same height as the outer cylinder 14.

FIG. 5 shows the outer cylinder 14 having the slits 18 and the cone-shaped outer cylinder 15 and the cone-shaped outer cylinder 15, which are separated from the first box-shaped dust collecting unit 2, except for the inner cylinder 16. The slits 18 are positioned at four places when the outer cylinder 14 contacts the outer box 34 of the first dust collecting unit 2.

FIG. 6 is a plan view illustrating the first box-shaped dust collecting unitor 2 except for the inner cylinder 16 and illustrates the principle that dust particles are removed by the first box-shaped dust collecting unit 2. A gas introducing direction 22 contacts the surface of the outer cylinder 14. Dust particles with a large inertia in the introducing gas and an initial position near to the wall has a trace 23 passing through the slits 18 due to the inertial force and are removed by colliding against the outer box 34 of the first box-shaped dust collecting unit 2. Dust particles with a small inertia and an initial position far from the wall do not exit through the slits 18, but flow along a trace 24 where the dust particles collide against the wall of the outer cylinder 14 due to the centrifugal force and are removed. Only dust particles with a very small inertial have a trace 25 along which the introducing gas swirls. The dust colliding against the wall of the outer cylinder 14 to be removed swirls to the lower end 26 of the cone-shaped outer cylinder and is collected and discharged through by the dust hopper 3 and the dust discharging tube 4. Dust colliding against the outer box 34 of the first box-shaped dust collecting unit to be removed by passing through the slits 18 slides down along the wall of the dust hopper 3 and is discharged through the dust discharging tube 4.

FIG. 7 shows an outer cylinder 35 and a cone-shaped outer dust hopper 21 of a first cylindrical dust collecting unit except for the inner cylinder 16.

FIG. 8 shows dust filter fixing plates 11, the dust filter 10, a cleaning compressed air container 6, diaphragm solenoid valves 7, compressed air spraying tubes 8, and compressed air spraying nozzles 9, separately.

FIG. 9 shows the structure of the inner cylinder 16 in which the lattice structure 17 is installed, in detail. The lattice structure 17 is installed to form a strong swirling flow and to form a uniform flow of the treating gas passing through the inner cylinder 16.

FIG. 10 is a plan view of the inner cylinder 16 in which the lattice structure 17 is installed. In this case, the size of unit lattices is less than a diameter of the dust filter 10.

FIG. 11 shows the structure of an inner cylinder 27, in which gas flow disturbing plates 28 are installed, in detail. The gas flow disturbing plates 28 are installed to disturb the swirling flow of the treating gas passing through the inner cylinder 27.

FIG. 12 is a sectional view illustrating the inner cylinder 27 in which the gas flow disturbing plates 28 are installed.

FIG. 13 shows an inner cylinder 29 in which a plurality of blades 30 form a slope and the lattice structure 17 is installed. The slope is configured such that the blades 30 are overlapped with each other by a predetermined area. Thus, there is a very low possibility where the treating gas does not pass through the lattice structure 17 and the inner cylinder 29 but passes through between the blades 30 to be introduced into the second dust collecting unit 5. Moreover, dust detached from the dust filter 10 by the cleaning can be discharged through not only the inner cylinder 29 but also between the blades 30.

FIG. 14 is a simplified plan view illustrating a single hybrid dust collector in which gas inlets 1 are formed in various positions. In addition to a basic hybrid dust collector module 31, a dust collector module 32 has two gas inlets 1 formed in the opposite sides thereof and a dust collector module 33 has total four of gas inlets formed in respective sides of a rectangular cross-section.

FIG. 15 is a simplified plan view illustrating a huge capacity dust collector in which a plurality of basic hybrid dust collector modules 31 are arranged in a single row.

FIG. 16 is a simplified plan view illustrating a huge capacity dust collector in which a plurality of basic hybrid dust collector modules 31 are arranged in two rows. The huge capacity dust collector is configured by adjusting the number of the basic hybrid dust collector modules according to amount type of the treating gas.

FIG. 17 shows an example of a huge dust collector in which eight basic hybrid dust collector modules 31 are arranged in two rows. The position of the gas inlet 1 and the configurations of the outlets 12 and the dust discharging tube 4 are adjusted according to a site condition.

The invention claimed is:

1. A modularized hybrid dust collector for removing dust contained in a treating gas by employing a plurality of dust collecting principles in a combination manner, the dust collector comprising: a first box-shaped dust collecting unit to remove dust contained in the treating gas that is introduced through a gas inlet using an inertial impaction and a centrifugal dust collecting; a second box-shaped dust collecting unit with a right rectangular cross-section in which a dust filter is installed such that a gas in which dust contained in the treating gas, which is introduced in the direction contacting a side of the first box-shaped dust collecting unit and a majority of dust contained in the treating gas is removed, is completely removed is discharged through an outlet; a reversed pyramid-shaped dust hopper to accommodate dust removed by the first box-shaped dust collecting unit and dust removed by the dust filter and detached from the surface of the dust filter by a periodic cleaning; and a dust discharging tube to discharge the dust accommodated in the dust hopper.

2. The modularized hybrid dust collector according to claim 1, wherein the dust filter comprises one of an impaction flow type cleaner including a compressed air container to periodically detach the dust attached to the surface of the dust filter, a diaphragm solenoid valve, a compressed air spraying tube, and a compressed air spraying nozzle, a vibrating cleaner, and a backflow cleaner.

3. The modularized hybrid dust collector according to claim 1, wherein the first box-shaped dust collecting unit and the first cylindrical dust collecting unit comprise a dust sliding plate installed in the upper corners thereof such that the dust detached from the dust filter is not accumulated on the corners but slides into the inner cylinder.

4. The modularized hybrid dust collector according to claim 1, wherein the first box-shaped dust collecting unit and the first cylindrical dust collecting unit comprise an inner cylinder having a gas flow disturbing plate and to substitute the inner cylinder in which the lattice structure is installed.

5. The modularized hybrid dust collector according to claim 1, wherein the first box-shaped dust collecting unit and the first cylindrical dust collecting unit comprise an inner cylinder having a slope in which a blade is installed and the lattice structure and to substitute the inner cylinder in which the lattice structure is installed.

6. The modularized hybrid dust collector according to claim 1, wherein the first box-shaped dust collecting unit comprises: an hollow outer box; an outer cylinder in which a plurality of slits have a predetermined width and height in the gas flowing direction and penetrate an outer circumference contacting the outer box; inner cylinders and positioned in the outer cylinder; and a cone-shaped outer cylinder coupled with a side of the outer cylinder and having a lower end positioned higher than a connecting point between the dust hopper and the dust discharging tube.

7. The modularized hybrid dust collector according to claim 1, comprising one of a basic hybrid dust collector module having a single inlet, a hybrid dust collector module having two inlets, and a hybrid dust collector module having four inlets.

8. The modularized hybrid dust collector according to claim 7, wherein a plurality of the basic hybrid dust collector modules are coupled with each other to form a plurality of rows.

9. The modularized hybrid dust collector according to claim 7, wherein a plurality of the hybrid dust collector modules having two inlets are coupled with each other to form a plurality of rows.

* * * * *